United States Patent
Dabbagh et al.

(10) Patent No.: US 6,701,425 B1
(45) Date of Patent: Mar. 2, 2004

(54) MEMORY ACCESS ADDRESS COMPARISON OF LOAD AND STORE QUEQUES

(75) Inventors: Ahmed Dabbagh, Saint Egrève (FR); Nicolas Grossier, St. Georges-de-Commiers (FR); Bruno Bernard, Echirolles (FR); Pierre-Yves Taloud, Grenoble (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/563,153

(22) Filed: May 2, 2000

(30) Foreign Application Priority Data

May 3, 1999 (EP) .............................. 99410056

(51) Int. Cl.⁷ ................................................ G06F 9/30
(52) U.S. Cl. ...................................... 712/225; 712/218
(58) Field of Search .................................. 712/225, 218, 712/216, 200, 23, 214, 215, 217; 711/138, 122, 167

(56) References Cited

U.S. PATENT DOCUMENTS

| | | | | |
|---|---|---|---|---|
| 4,247,920 A | | 1/1981 | Springer et al. ............. | 365/230 |
| 4,467,414 A | | 8/1984 | Akigi et al. ................. | 364/200 |
| 4,855,904 A | * | 8/1989 | Daberkow et al. ........... | 712/218 |
| 5,280,593 A | | 1/1994 | Bullions, III et al. ....... | 395/375 |
| 5,323,489 A | * | 6/1994 | Bird ............................ | 711/167 |
| 5,465,336 A | | 11/1995 | Imai et al. .................... | 395/375 |
| 5,471,598 A | * | 11/1995 | Quattromani et al. ........ | 711/122 |
| 5,835,747 A | * | 11/1998 | Trull ............................ | 712/216 |
| 5,854,914 A | | 12/1998 | Bodas et al. ................. | 395/392 |
| 5,881,262 A | | 3/1999 | Abramson et al. .......... | 395/392 |
| 5,937,178 A | * | 8/1999 | Bluhm ......................... | 712/218 |
| 6,032,251 A | * | 2/2000 | Tran et al. ................... | 712/216 |

FOREIGN PATENT DOCUMENTS

FR 2 489 021 2/1982

OTHER PUBLICATIONS

European Search Report from European application No. 99410056, filed May 3, 1999.

* cited by examiner

Primary Examiner—Henry W. H. Tsai
(74) Attorney, Agent, or Firm—Wolf, Greenfield & Sacks, P.C.; James H. Morris

(57) ABSTRACT

A computer system with parallel execution pipelines and a memory access controller has store address queues holding addresses for store operations, store data queues holding a plurality of data for storing in the memory and load address storage holding addresses for load operations, said access controller including comparator circuitry to compare load addresses received by the controller with addresses in the store address queue and locate any addresses which are the same, each of said addresses including a first set of bits representing a word address together with a second set of byte enable bits and said comparator having circuitry to compare the byte enable bits of two addresses as well as said first set of bits.

15 Claims, 6 Drawing Sheets

MEMORY ACCESS ADDRESS COMPARISON OF LOAD AND STORE QUEQUES

The invention relates to apparatus and methods for accessing memory in a computer system and particularly for comparing load and store addresses.

BACKGROUND OF THE INVENTION

Computer systems may comprise a plurality of parallel execution pipelines used to generate access addresses for load and store operations in a memory as well as data for storing in the memory. Where more than one pipeline is used, instructions may pass through the pipelines at different rates so that data and addresses from the different pipelines may arrive at a memory access unit at different times. Addresses and data may be put onto queues for use in memory access operations.

It is an object of the present invention to provide improved apparatus and methods for handling load and store queues in accessing a computer data memory.

SUMMARY OF THE INVENTION

The invention provides a computer system having a memory, a plurality of parallel execution pipelines and a memory access controller, said access controller providing a plurality of queues including store address queues holding addresses for store operations to be effected in the memory, store data queues holding a plurality of data for storing in the memory at locations identified by the store address queues, and load address storage holding addresses for load operations to be effected from the memory, said access controller including comparator circuitry to compare load addresses received by the controller with addresses in the store address queue and locate any addresses which are the same, each of said addresses including a first set of bits representing a word address together with a second set of byte enable bits and said comparator having circuitry to compare the byte enable bits of two addresses as well as said first set of bits.

Preferably said memory includes two separately accessible memory banks, each bank storing half a word at each word address.

Preferably said byte enable signals indicate which byte positions at each word address are to be accessed.

Preferably said comparator comprises a plurality of comparator devices, two of which effect comparison of addresses in respective memory banks, each of said two comparator devices having first inputs for comparing the bank word addresses for a pair of load and store addresses and second inputs for comparing respective byte enable signals of a pair of load and store addresses.

Preferably control circuitry is provided to select memory access operations from said queues, said control circuitry being responsive to the output of said comparator circuitry to select a load operation before a store address operation if the comparator circuitry does not indicate a store operation at the same address as the load operation.

Preferably said control circuitry is operable to select store operations before load operations when said comparator circuitry outputs a hit signal to indicate the same address on a store address queue as a received load address.

Preferably said control circuitry includes hit flag circuitry responsive to execution of an instruction to effect all current store operations in the store address queue before executing any further load operations, said hit flag being set in response to execution of said instruction.

Preferably said hit flag is operable when set to provide to the control circuitry the same input as said comparator circuitry when the comparator outputs a hit signal to indicate the same address on a store address queue as a received load address.

Preferably said plurality of execution pipelines include one or more pipelines in a data unit arranged to execute arithmetic operations and one or more pipelines in an address unit arranged to execute memory addressing operations.

Preferably at least two parallel pipelines are provided in the data unit and at least two parallel pipelines are provided in the address unit.

Preferably said memory includes two or more memory regions having different mapping within the addressable memory space of the computer system, said comparator circuitry including comparator means to compare the mapping of load addresses with each entry in the store address queues as well as comparing the word address and the byte enable signals.

The invention includes a method of operating a computer system having a memory, a plurality of parallel execution pipelines and a memory access controller, said method comprising forming a plurality of queues including store address queues holding addresses for store operations to be effected in the memory, store data queues holding a plurality of data for storing in the memory at locations identified by the store address queue and load address storage holding addresses for load operations to be effected from the memory, said method further comprising comparing received load addresses with addresses in a store address queue to locate addresses which are the same, each of said addresses including a first set of bits representing a word address together with a second set of byte enable bits, the comparison including comparing the byte enable bits of the two addresses as well as comparing said first set of bits.

Preferably, store addresses are removed from the store address queue in accordance with the order of entries in the queue and said comparison of addresses compares the next load address with all entries in the store address queue.

Preferably data is stored in said memory in two separately addressable memory banks sharing common addresses, each bank storing half a word at each word address, said comparison being effected by comparing bank word addresses in two comparison devices each for a respective bank and each for saving the same bank word address, and comparing in a further comparison device byte enable signals which represent respectively byte enable signals for the two different banks.

The method may include executing an instruction to set a hit flag indicating that all current store addresses in the store address queue should be accessed for a store operation before executing any further load operation.

DESCRIPTION OF THE PREFERRED EMBODIMENT

Figure 1:
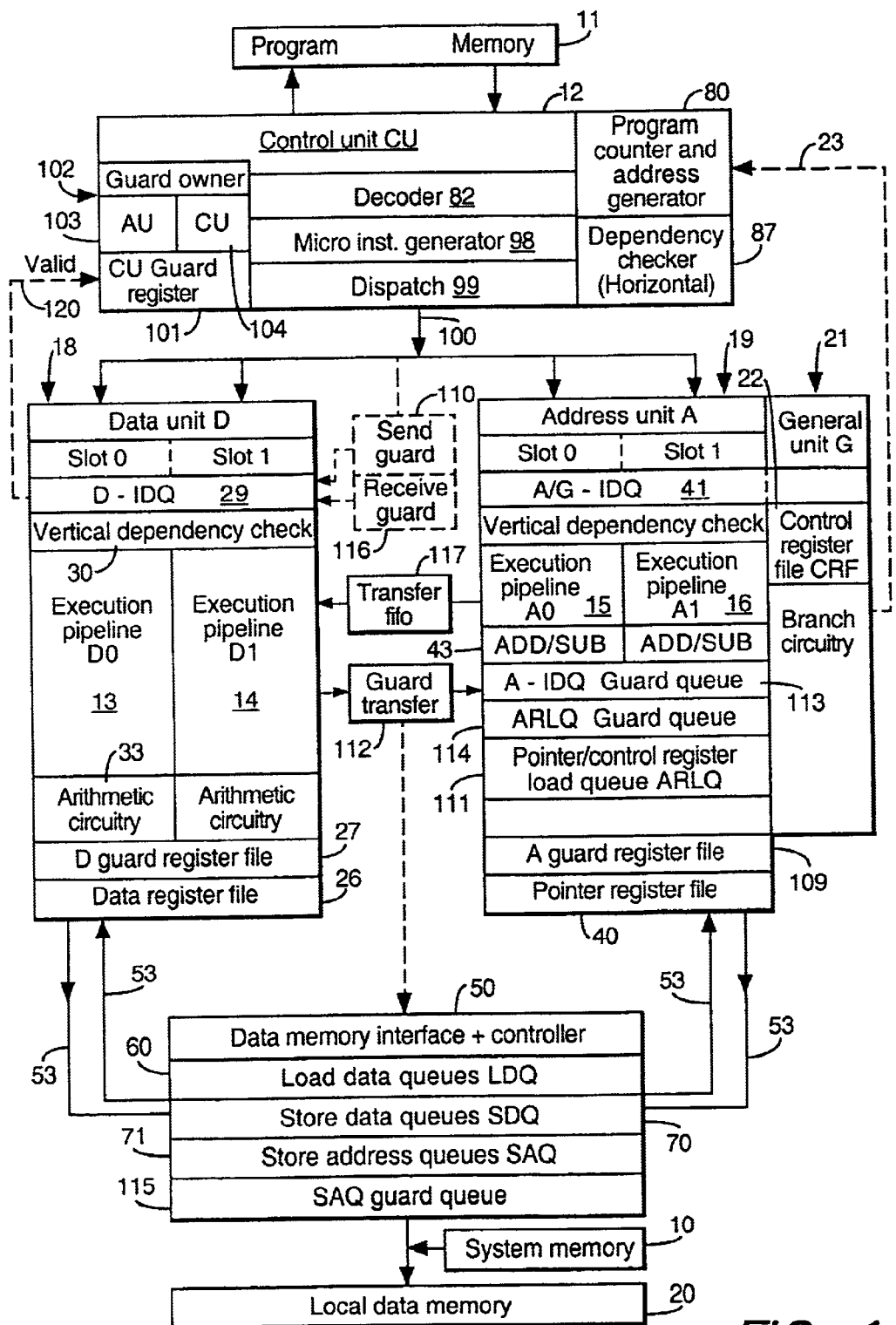
FIG. 1 shows a computer system in accordance with the present invention.

The computer system of this example is arranged for the parallel execution of a plurality of instructions and is particularly suited to providing a high digital signal processing (DSP) performance. Instructions are held in a program memory 11 and after passing through a control unit 12 are supplied to four parallel execution pipelines 13,14,15 and 16. Pipelines 13 and 14 are shown as slot 0 and slot 1 of a data unit arranged to execute instructions carrying arithmetic operations. Pipelines 15 and 16 are shown as slot 0 and slot 1 of an address unit 19 used to execute instructions for memory accesses to a data memory 20. Slot 1 or Slot 0 of the address unit 19 may also be used to supply instructions to a general unit 21 which shares some resources with the address unit 19. The general unit 21 includes a control register file 22 as well as branch circuitry which is used to provide instruction branch information on line 23 to the control unit 12.

The two pipelines 13 and 14 in the data unit 18 share a common data register file 26 and a common guard register file 27 holding the master guard values which may be associated with the instructions. The two pipelines also derive instructions from a common instruction dispatch queue (D-IDQ) 29 in the data unit 18 and instructions in the queue 29 are checked for data dependency by common vertical dependency check circuitry 30 in the data unit 18. The sequence of operations in each of the pipeline stages in the data unit 18 include an operand fetch usually accessing one of the register files 26 or 27 followed by two execution stages which may use arithmetic circuitry 33 followed by a data write stage at which the result of an arithmetic operation is returned to the register file 26 and 27. A similar pipeline exists for both pipelines 13 and 14 on the data unit 18.

Similarly for the address unit 19, both pipelines 15 and 16 access a common register file 40 holding pointer values for use in load or store operations in the data memory 20. The two pipelines each take their instructions from a common instruction dispatch queue (A-IDQ) 41 and a similar vertical dependency check is provided in common for both pipelines 15 and 16 in the address unit 19. The vertical dependency check is similar to that already referred to in the data unit 18. In executing instructions through the two pipelines 15 and 16, accesses will be made to the register file 40. Add and subtract units 43 may be used in execution of the instructions. Each of the pipelines 15 and 16 in the address unit 19 includes an operand fetch followed by an execution stage and an address write back stage.

Both the data unit 18 and the address unit 19 are connected to the data memory 20 through a data memory interface and controller 50. The controller 50 is connected by buses 53 to both the data unit 18 and the address unit 19. The interface and controller 50 includes a plurality of queues each connected to the buses 53. These queues include load data queues (LDQ) 60 for data which has been read from memory and is awaiting loading into register files of the data unit 18 or address unit 19. The controller 50 also includes a plurality of store data queues (SDQ) 70 for data awaiting storage in the memory. Store address queues (SAQ) 71 are provided to indicate the locations in the memory at which the data is to be written. The memory includes a local memory 20 having X and Y memory regions as well as a system memory 10.

It will be understood that when instructions are executed to load data from the data memory 20 into the data register files of the data unit 18, the address unit 19 will access the data memory 20 and load the required data into the load data queues 60 prior to completing the update of the data register file 26 by transferring the data from the appropriate queue 60. Similarly when instructions are executed to store data from the data unit 18 into the data memory 20 the appropriate data may be held in the store data queues 70 together with the store addresses in queue 71 prior to completing the store operation in the data memory 20.

By executing the memory addressing instruction in the address unit 19 in separate parallel pipelines from those provided in the data unit 18, the computer system operates access decoupling in that the memory accesses are effected independently of the arithmetic operations carried out within the data unit 18. This reduces the problem of memory latency. In a digital signal processing system which operates regular and repeated operations the memory latency can be hidden from the executing program.

In the above description, all instructions which are fed through pipelines 13, 14, 15 and 16 are subject to a vertical dependency check and if any data dependency is found which cannot be resolved by a bypass, the execution unit operates to cause a temporary stall in one of the pair of pipelines 13 or 14 or in the pair 15 and 16 so as to cause a temporary delay in one of the pipelines of the pair so as to resolve the data dependency. The operand fetch stage in each of the pipelines looks to see the first entry in the IDQ, and performs the vertical dependency check between the operands of this entry and the operands that are already in the pipelines. If there is no dependency problem it performs the operand fetch and reads the micro-instructions from the IDQ. If there is a problem, it does not perform the operation fetch on that cycle so the micro-instruction stays in the IDQ, and starts again on the next cycle with the same micro-instructions. The delay may be induced by the instruction dispatch queue 29 or 41 providing a signal corresponding to no operand fetch being fed to the execution pipeline for each cycle of delay that is required in order to resolve the data dependency. It will be understood that a check for a data dependency includes any form of data, including data representing guard values.

The control unit 12 is also arranged to provide a horizontal dependency check. In this specification a data dependency between instructions that are supplied to the parallel pipelines in the same machine cycle is referred to as a horizontal dependency. The control unit 12 includes a program counter and address generator 80 to provide a memory address for an instruction fetch operation from the program memory 11. The machine may operate in a selected one of a plurality of instruction modes including superscalar modes of variable instruction bit length or in very long instruction word (VLIW) mode. The control unit 12 may include an instruction mode register to indicate the instruction mode in which the machine is operating.

In use, a plurality of instructions are obtained from the memory 11 in a single fetch operation during one cycle and are decoded by a decoder 82 in the control unit 12. They are checked for horizontal data dependency by dependency checking circuitry 87 to indicate if a horizontal data dependency has been located. After decoding, the instructions are used to generate microinstructions for each of the execution pipelines. The instructions from the decoder 82 are passed to a microinstruction generator 98 which generates a plurality of parallel microinstructions which are output by a dispatch circuitry 99 through parallel paths 100 to the four slots of the parallel execution pipelines 13, 14, 15 and 16 and for the general unit 21. If a horizontal dependency was located, the microinstructions on lines 100 would include an indication to the instruction dispatch queues of the data unit 18 or address unit 19 that some action, such as a pipeline stall, was necessary in the execution pipelines to resolve the horizontal dependency.

In this example, each instruction is provided with a guard indicator G between G0 and G15 which is encoded into the instruction. If the indicator has a guard value which is true (has the value of 1), then the instruction will be executed normally (i.e. updates the architectural state of the machine). If the indicator has a guard value which is false (has the value of 0), then normal execution of the instruction will not be completed (i.e. the architectural state of the machine is not changed by the instruction). Resolution of a guard value may be done in different pipeline stages of the machine.

The guard for each instruction may be selected between G0 and G15 and in this particular example the guard G15 is always true. The value true or false attributed to guards G0–G14 is however dependent upon the guard values held at any particular time in a guard register file. The master guard register file in this example is guard register file 27 in the data unit 18. However, a supplementary or shadow guard register file (normally copies of the master file 27) is provided by a control unit guard register file 101 in the control unit 12. The control unit 12 also includes a register 102 to indicate which unit is currently known to be the guard owner in respect of each guard indicator. Register 102 has a first bit 103 for each guard indicator which if holding the value 1 indicates that the address unit 19 is currently the guard holder for that indicator. If bit 104 for each guard indicator is set to the value 1 then it indicates that the control unit 12 is currently the guard owner for that guard indicator. If neither bit 103 nor 104 is set then the default condition indicates that the master guard register file 27 must be used so that the data unit 18 is the guard owner. The address unit also has a shadow guard register file 109 which may be updated by guard modifier instructions executed by the address unit 19. The guard values held in the guard register files can be changed by a guard modifier instruction (GMI) instruction executed by the data unit 18 or the address unit 19. Those executed by the data unit will update the master file 27 and the shadow file 101. Those executed by the address unit will update the shadow file 109 and the master file 27 (and hence the shadow file 101).

In normal operation the guard register file 27 in the data unit 18 maintains the architectural state of the guard values G0 to G14 and the register file is common to both execution pipelines 13 and 14. The operative values of the guards are the same for all execution pipelines although as will be explained below, the different pipelines may access different register files to obtain the guard values.

In this example the master register file for the guard values is held in the data unit 18 as it is the data unit that will most commonly execute instructions likely to change the value of the guards. Greater efficiency of execution cycles is therefore achieved by maintaining the master guard values in the register file which is directly accessed by execution of the instructions in the data unit 18. When instructions are fed through either slot 0 or slot 1 of the data unit 18 the required guard value may be taken directly from the master guard register file 27 in accordance with the guard indicator that accompanied the microinstructions fed into the data unit 18 from the control unit 12, unless the control unit 12 is the owner of the guard in which case the guard value will have been taken from the shadow registers 101 in the control unit 12.

In the case of instructions to the address unit 19, the more general position will be the default condition in the guard owner register 102 indicating that guard ownership does not belong to the address unit 19 or the control unit 12 and consequently the guard values required for execution of the instructions in the address unit 19 will need to be obtained from the guard register file 27 in the data unit 18. The microinstructions fed through lines 100 to the execution units will include supplying a "send guard" (sndG) instruction to the data unit 18 as the same time as supplying the appropriate microinstruction to the correct slot of the address unit 19. The "send guard" instruction will be slotted into the instruction dispatch queue 29 of the data unit 18 in the same cycle of operations as the microinstruction required for the address unit 19 is slotted into the instruction dispatch queue 41 for the address unit. All micro-instructions in a given execution unit are always executed in order and all guard manipulations and transfers are maintained in order with respect to these micro-instructions. This guarantees the synchronicity of guard transfers (ie for every guard emission from a given execution unit there is an opposite guard reception in another execution unit and all these are done in order. The control unit has responsibility to generate the correct micro-instructions for guard transfers; the sending or receiving execution unit only sees the send or receive (respectively) micro-instruction ie the action that it must do). In this way the correct sequencing occurs with the correct guard value being obtained from the guard register file 27 corresponding to the instruction being executed in the address unit 19. The supply of the "send guard" instruction in such a situation is illustrated at 110 in the drawing. The address unit 19 has a queue of instructions 41 awaiting dispatch to the execution units. It also has a queue 111 (ARLQ) of items awaiting loading into the pointer or control registers 40 or 22. There are also queues 71 in the memory interface control 50 of store addresses queues awaiting a memory access as a result of partial execution of a store instruction in the address unit 19. When the address unit 19 awaits a guard transfer from the data unit 18, the instruction in the address unit 19 is stalled in the A-IDQ 41 or in the ARLQ 111 or in a store address queue 71 until the requested guard value is transmitted from the data unit 18 through guard transfer circuitry 112 to the required destination. The transfer of the correct guard value will occur when the data unit 18 executes in its pipeline operation the "send guard" instruction and the guard value which is transferred to either the address unit 19 or the data memory controller 50 will need to be held in a queue ready for continued execution of the instruction once the stall is terminated. The transferred guard value will be held in an A-IDQ guard queue 113 if the guarded instruction was stalled in the IDQ 41. If the stall was in the ARLQ queue 111 then the transferred guard value will be held in an ARLQ guard queue 114. In the case of a store instruction where the store address had been added to a SAQ 71 in the memory controller 50, the guard value will be transferred from circuitry 112 to an SAQ guard queue 115 in the data memory controller 50 so that the memory access may be implemented in accordance with the entry in the SAQ 71 if the guard value transferred permits this. It will be seen that by this provision, the address unit can execute a memory store instruction as far as identifying the required store address and adding that address to a queue in the interface 50 prior to checking whether or not the guard value of the store instruction is true or false. The store operation will be held in a queue 71 until the guard value is checked and will only proceed to completion if the guard value is true. In each case where the guard value is transferred to the address unit 19 from the data unit 18, the stalled instruction for the address unit or general unit 21 will be resumed or rendered inoperative depending on the guard value transferred from the data unit file 27.

The use of the guard queues 113, 114 and 115 allow resynchronisation of the guard values with the microinstruction that caused the request "send guard" 110 to be sent to the data unit 18. The above description for operation of a guarded store instruction indicated how the effective store address could be put on a queue 71 prior to resolving the guard value. The address unit 19 may be operated with an earlier stall in the execution of a store instruction so that the effective address is not calculated and fed to the memory controller 50 until after the guard value has been transferred and resolved. Similarly a guarded load instruction may be executed by the address unit 19 to access the memory and obtain the required data for addition to a load data queue 60 prior to resolving the guard value. Alternatively the address unit may cause an earlier stall awaiting resolution of the guard value transferred from the data unit prior to obtaining the data from the memory and putting it into the queue 60. In the case where the data is obtained from the memory and put onto a load data queue 60 prior to resolution of the guard value, the appropriate register file 26, 40 or 22 is updated by a load operation from the load data queue 60 only if the guard value is found to be true. In the case of a false guard value, the register files are not updated and the appropriate execution unit effects a read of the load data queue 60 to remove the unwanted data from the queue without updating any destination register file.

Transfers of data between the data unit 18, address unit 19 and the data memory interface and controller 50 are carried out in accordance with Request/Grant protocol. In this way transfers of data occur only at controlled times which permit maintenance of the correct order of each operation. It will be understood that with parallel execution of instructions in slot 0 and slot 1 of the data unit as well as instructions in slot 0 and slot 1 of the address unit, it is necessary to maintain the correct ordering between slot 0 and slot 1. By use of the Request/Grant protocol, the memory controller will be aware of the required order between slot 0 and slot 1 through the operation of the Request/Grant protocol used by the address unit in providing the store or load address to the controller 50. However, in the case of store operations it is possible that data from the data unit may arrive at the controller 50 with the incorrect order between slot 0 and slot 1. In which case some reordering of the data onto a store data queue (SDQ) will be effected by control circuitry 160 in the data memory controller.

All load operations issued by the address unit are carried out in strict order and similarly all store operations issued by the address unit are carried out in strict order. It is however possible for load operations to by-pass and overtake store operations provided there is no conflict on the memory address that is to be used for the two operations. If there is any conflict then a store operation preceding a load must be carried out before the load can be effected.

Figure 2:
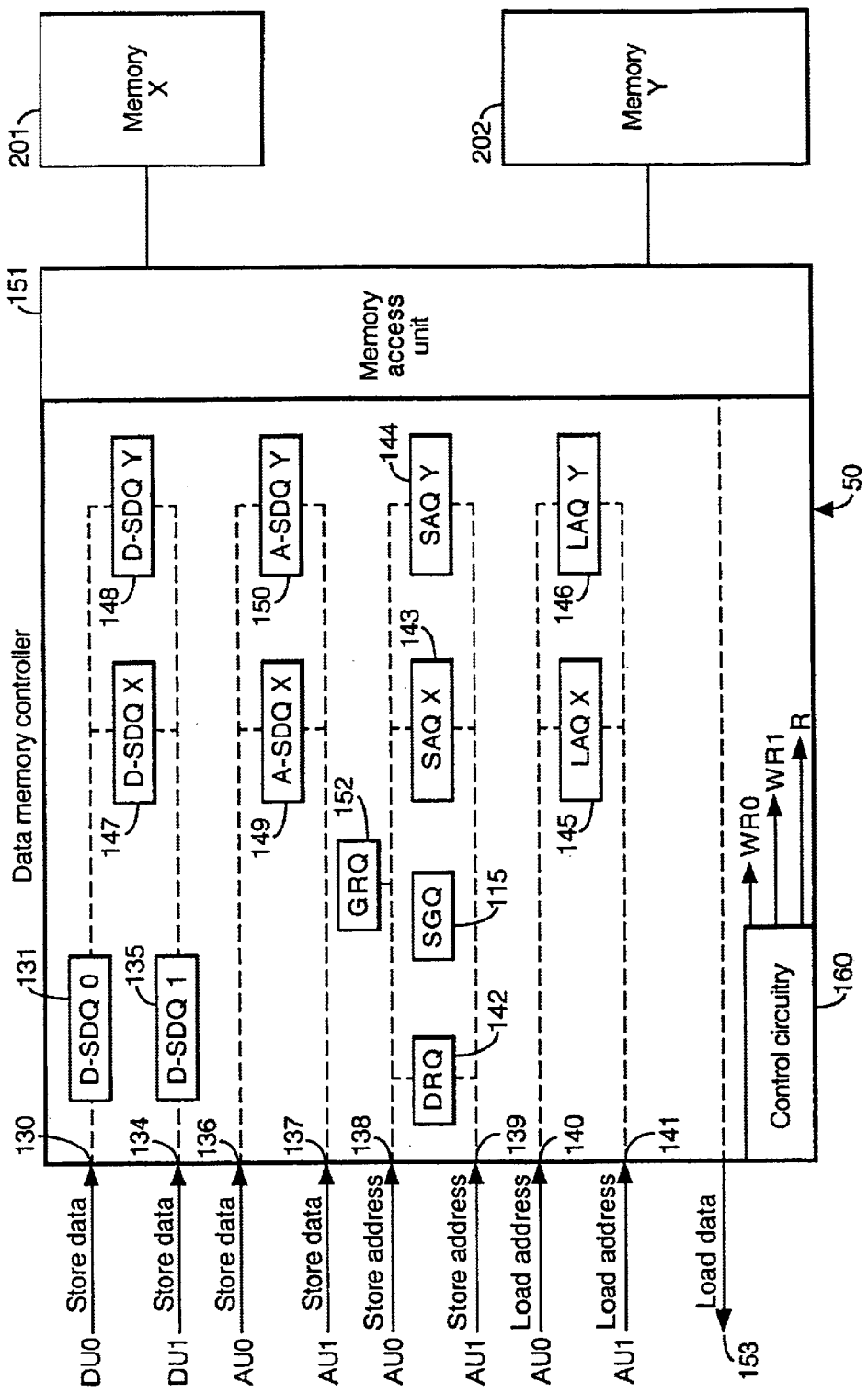
FIG. 2 illustrates in more detail a plurality of queues formed in a data memory controller forming part of the apparatus of FIG. 1.

FIG. 2 illustrates in more detail some of the queues that are held in the memory controller 50 together with the inputs which arrive from the data unit 18 and address unit 19. Input 130 provides a store data input from slot 0 of the data unit 18 and data is initially held on a queue 131 until information is available to clarify whether the data is to be written into the X memory 201 or the Y memory 202. Queue 131 is formed by a FIFO. All other queues in the controller 50 are similarly formed by a FIFO. A further input 134 receives data from slot 1 of data unit 18 and is held on a queue 135 similar to queue 131 until information is available on the data routing queue 142 to determine whether the data is to be written into the X or the Y memory.

A further input 136 receives data to be stored in the memory which has been supplied by slot 0 of the address unit 19. Input 137 similarly receives data to be stored which has been supplied by slot 1 of the address unit 19. The store addresses are input at 138 and 139 respectively from slot 0 and slot 1 of the address unit 19. Load addresses from slot 0 and slot 1 of the address unit 19 are input at 140 and 141 respectively. The store addresses which are input from the address unit also form the queue in a Data Routing queue 142. Data which is input from the data unit giving guard values necessary for store or load instructions is put on a queue 115 for guard values. Although separate data and address queues are formed respectively for the X and Y memories, each of these queues merges appropriate data or addresses which relate to either slot 0 or slot 1. However the guard queues need less storage capacity and separate queues are formed for each of slots 0 and 1 under control of a guard routing queue 152.

The addresses which are supplied from the address unit 19 will indicate both for store and load operations whether the memory to be accessed is the X or Y memory and consequently the store address details from inputs 138 and 139 are separated into a queue 143 for store addresses in the X memory and a further queue 144 for store addresses in the Y memory. Similarly the load addresses which are input at 140 and 141 are separated into a first load address queue 145 for the X memory and a further load address queue 146 for the Y memory. Each of queues 145 and 146 may be bypassed if there is no conflict with a store address. The data which is to be stored in the memory is put onto one of four possible queues. Queue 147 holds data from the data unit which is to be stored in the X memory. Queue 148 holds data from the data unit which is to be stored in the Y memory. Queue 149 holds data from the address unit which is to be stored in the X memory and queue 150 holds data from the address unit which is to be stored in the Y memory. A memory access unit 151 controls transfer of data to or from the queues in the controller to or from the memories 201 or 202.

In the case of load operations data is read from the memory through the access unit 151 and forms an output 153 which transfers the data to a load data queue 60 as described with reference to FIG. 1.

Figure 4:
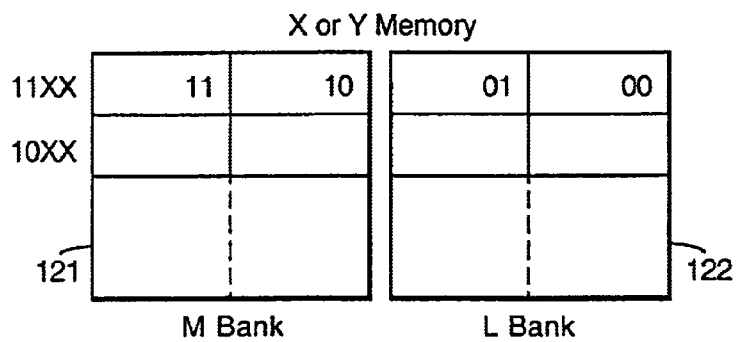
FIG. 4 illustrates more detail of the of the data memory of FIG. 1.
Figure 5:
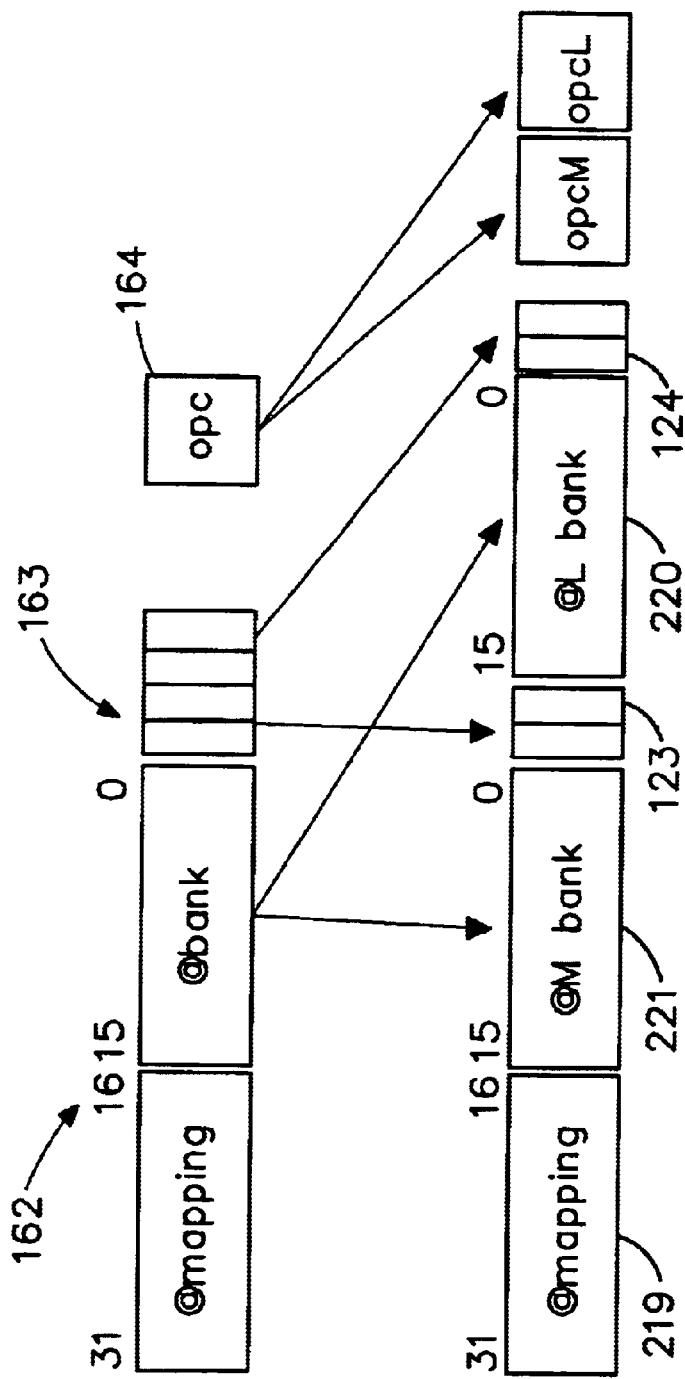
FIG. 5 shows the form of address and Opcode details supplied by the address unit of FIG. 1.

Inputs from the address unit on inputs 138–141 may be of the type shown in FIG. 5. This comprises a 32 bit word 162 which provides an address together with 4 bits 163 providing byte enable signals and an Opcode 164. The Opcode 164 is supplied to the control circuitry 160 to determine whether the operation is a load store or move. It may also be a NOP (no operation and so do nothing) or a barrier instruction to flush all operations present in the memory controller and awaiting action. The address 162 includes a most significant set of bits 219 which determine the mapping of the memory location to be used, thereby indicating whether the memory access is for the X or Y memory or for a systems memory or further external memory. Each of the X and Y memories is formed of two banks M and L each bank including only half a word at each-address in the bank. This is shown in FIG. 4 where the M bank is marked 121 and the L bank is marked 122. Each word address has two bytes in the M bank and two bytes in the L bank. As shown in FIG. 5, the least significant bits of the address 162 are provided to the M bank and the L bank of the respective one of the X or Y memories which have been determined by the mapping address of the most significant bits in the address 162. The byte enable bits 163 are split into two groups. Two bits 123 are supplied to the M bank and two bits 124 are supplied to the L bank. In this way the correct bytes are accessed in the appropriate word addresses in both the M and L banks. Similarly the Opcode 164 is split to provide the required Opcode to both the M bank and the L bank. By use of the two memory banks each holding half a word, it is possible to access two unaligned half words in a single memory access cycle. The bank address fed to one of the memory banks may be offset by circuitry in the address unit 19 so as to address an adjacent row in the other memory bank and byte enable signals fed to each of the banks allows two half words from adjacent rows to be accessed in a single cycle. For aligned half words, the bank addresses 220 and 221 will be the same but for unaligned half words the address shown in the lower part of FIG. 5 will have an offset in one bank address relative to the other.

Figure 3:
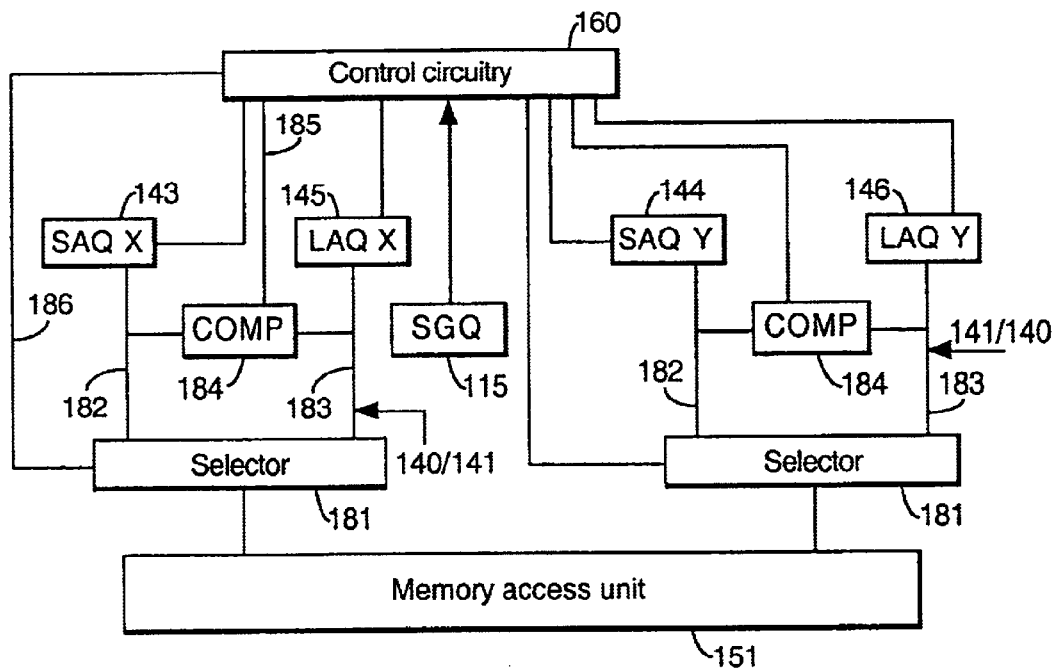
FIG. 3 shows address comparison circuitry for use with the queues shown in FIG. 2.

The manner of operating the memory accesses from the queues of FIG. 2 will be described with reference to FIG. 3. As shown, there are queues of store addresses and load addresses for each of the X and Y memories. The control circuitry 160 is arranged so that entries on the queues are removed in order in accordance with a normal FIFO operation. However, load operations received by the controller will take priority over store operations unless there is conflict on the memory address required by the two operations. In that event store operations must take place before a load operation using the same memory location. The operation will be described with reference to the X queues shown in FIG. 3 although it will be understood that a similar operation applies for the Y queues. A selector 181 determines whether the memory access unit 151 receives a load operation or a store operation from queue 143. The selector 181 receives one input 182 from the SAQX 143 and on line 183 it receives the X load address input from 140 or 141. The signals 182 and 183 are compared by a comparator 184 which provides a signal on line 185 to the control circuitry 160 to indicate whether the queue 143 have any conflict of address location thereby providing a match signal indicating a hit in an associate operation. The comparator 184 compares the load address with all valid entries in the store address queue. For any entries where a hit is located by the comparator 184, the signal is supplied to the control circuitry 160 which in turn provides a signal on line 186 to the selector 181 to ensure that the output 182 from the store address queue 143 is acted upon so as to change the value in the memory location prior to the load operation being carried out using that memory address. In that event, the load address at input 140 or 141 is put on the load address queue 145 for later removal when no more store addresses conflict with that load address. If however no hit is found by the comparator 184, then the control circuitry operates the selector 181 to take the output 183 from the load input 140 or 141 in preference to the store address queue output 182. In this way the load operation will bypass the queue 145 and may take place in a single cycle provided no hit arose in the comparison with the store addresses. The load address will be discarded on the following cycle.

A similar operation occurs for the store address queue 144, load address queue 146, and similar components have been marked with the same reference numerals as used for the X circuitry.

It will however be understood that the control circuitry 160 can only carry out the operation indicated by the Opcode 164 of FIG. 5 if the guard value associated with the instruction has been resolved as true or false thereby indicating that the instruction should be carried out or not. As described with reference to FIG. 1, the guard indicator will accompany the address and Opcode supplied by the address unit to the data memory controller 50. However, when that case is put on the store address queue in the data memory controller 50, the value to be assigned to that guard indicator may not have been resolved by the data unit. When that value has been resolved it is supplied to the correct guard value queue 115. The appropriate guard value is checked by the control circuit 160 corresponding to the store instruction which is being taken from one of the queues 143 or 144. If the guard value is true then the execution of the access operation will continue. If however it is false, then the access is not executed. The entry on the store address Q will however be removed at the time its guard value is considered by the control circuitry 160 so that even if the memory access is not carried out, the entry is removed from the appropriate address queue. In the case of store operations, the Opcode will indicate if the store is speculative or whether the guard has been resolved. If resolved and true the store may go ahead without waiting for the guard value to arrive on the guard value queue. For load operations it is not necessary to resolve the guard value in the memory controller as the data read from memory can be put on a load data queue 60 on the guard resolution carried out before loading into a register.

Figure 6:
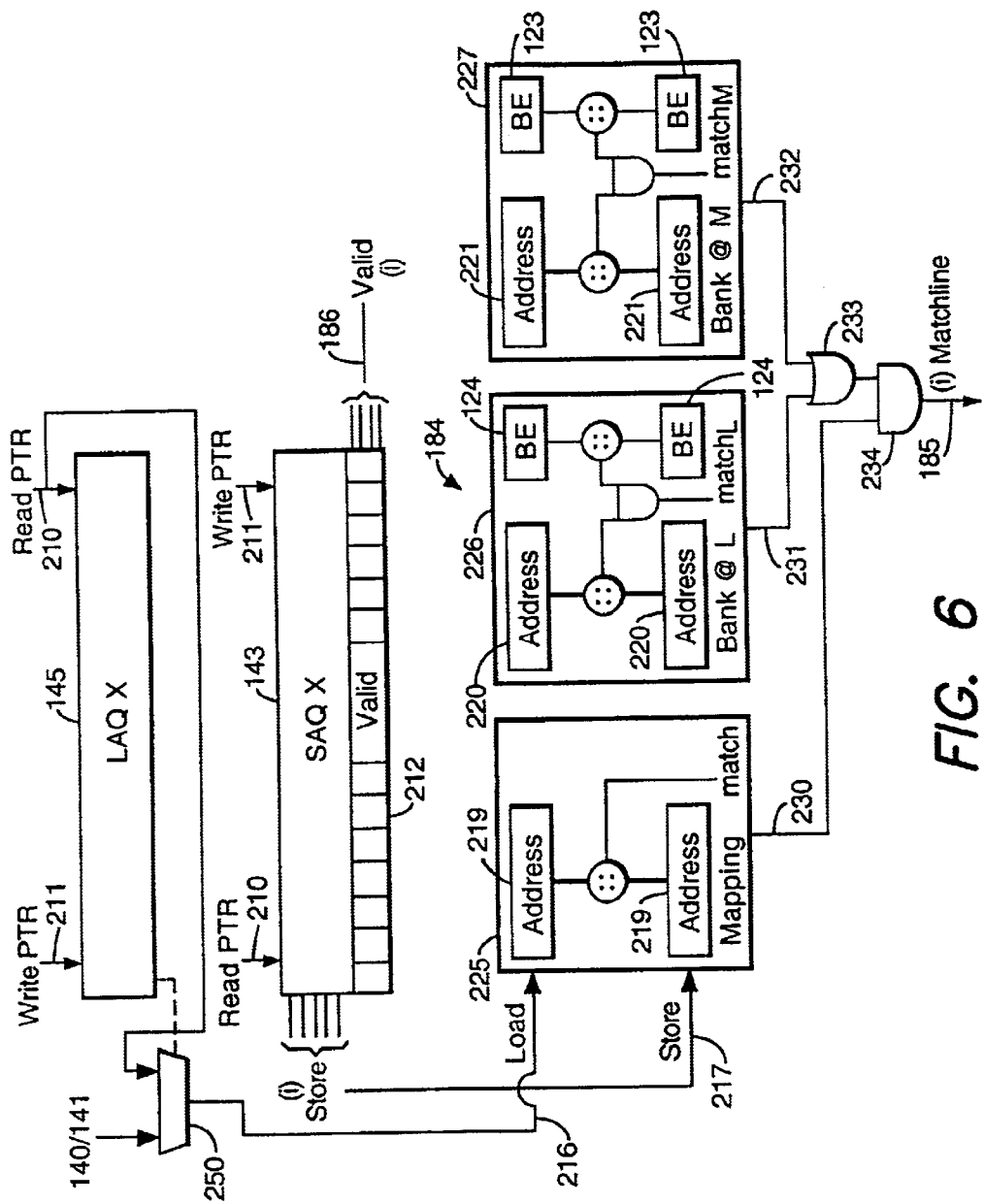
FIG. 6 shows more detail of the comparison circuitry shown in FIG. 3.

More details of the comparison circuitry 184 used to detect store and load conflicts is illustrated in FIG. 6. This example relates to the load address queue 145 and the store address queue 143 but it will be understood that similar circuitry is used to compare other load and store queues. Each of the queues is formed as a FIFO with rolling read and write pointers 210 and 211 respectively. Each location in the store address queue 143 is provided with a valid bit indicator 212. When an entry is written into the queue the valid bit is set to indicate "valid" and after reading from the queue the read pointer resets the bit to "invalid". The addresses have the form already described in FIG. 5. That means that the address consists of the most significant set 219 representing the mapping, the least significant bits 220 and 221 which represent respective M and L bank addresses. It also includes the byte enable bits 123 and 124 for each of the M and the L banks. The comparator 184 includes a first comparison section 225 which looks for a mapping match by comparing the mapping bits 219 of the load and store addresses. A further comparison section 226 compares the bank address bits 220 for the L bank as well as bits 124 for the byte enable bits supplied to the L bank. A further comparison section 227 compares the bank address bits 221 for the M bank as well as the byte enable bits 123 for the M bank. Each of the comparison sections 225, 226 and 227 looks for a match between the corresponding bits of the load and store addresses and when matches are found outputs are provided respectively on lines 230, 231 and 232. The outputs 231 and 232 are supplied through an OR gate 233 which has an output forming an input of an AND gate 234. The AND gate 234 also receives a line output 230. In this way, a match indicating an address conflict between the store and load is provided on line 185 when matches are found on all three comparator sections 225, 226 and 227.

Figure 7:
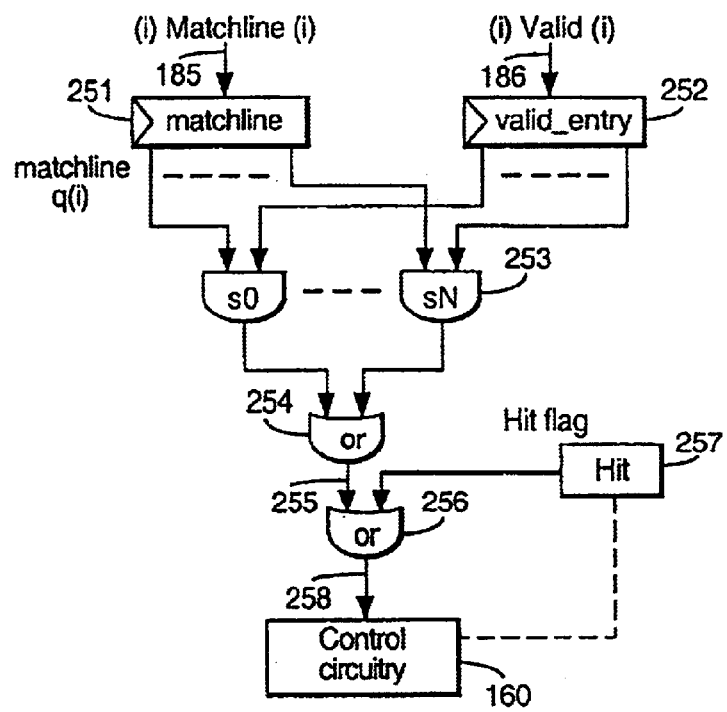
FIGS. 7 and 8 illustrate in more detail the output lines for each location in the store address queue.
Figure 8:
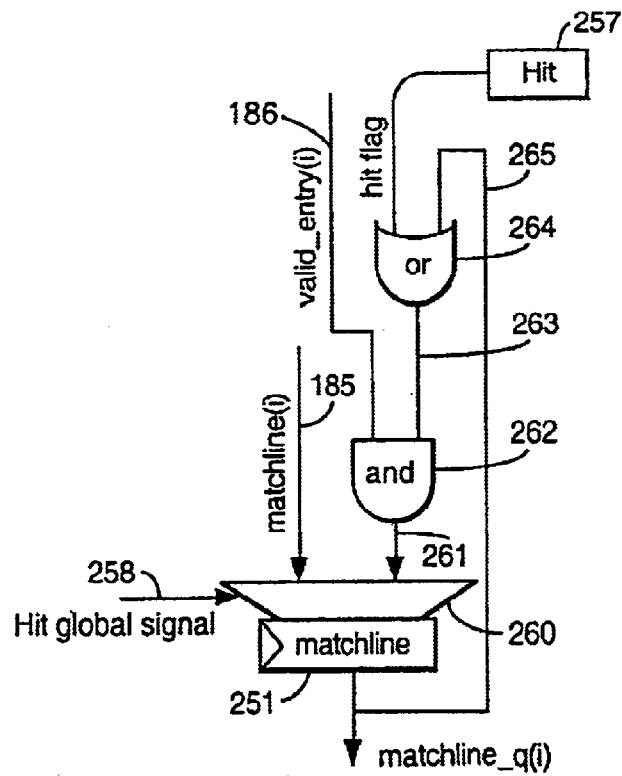

It will be understood that the comparator circuit 184 shown in FIG. 6 is provided for a single store address location in queue 143 and comparator circuitry similar 184 is provided for each store location in the store address queue 143. The store address 217 which is input to the comparator 184 is obtained from one location only indicated as store address (i). The load address input 216 is selectively derived either from the front entry in the load address queue 145 or from the load address inputs 140/141 if the load address queue 145 is empty. In this case queues 143 and 145 relate to the X memory region although it is understood that similar circuitry for FIG. 6 applies to the Y memory region. Any new load address from either slot 0 or slot 1 is input to the selector 250 and selected as the load address input 216 to the comparator if queue 145 is empty. If however there are any entries in queue 145 any new load address must be put on the queue behind the last entry already on the queue. The same load input 216 is provided to each of the comparator circuits 184 corresponding to each of the entries in the store address queue 143. The output on line 185 will therefore indicate if there is a match between the load address and the store address at location (i) in queue 143. Similar output lines 185 will be provided for each location in the store address queue 143. These are shown in FIGS. 7 and 8. Similarly, the valid entries 212 from the store address queue 143 are provided on separate outputs from the store address queue and the line representing valid (i) is shown as an input in FIGS. 7 and 8. It will however be understood that store address lines, valid lines and match lines are provided for each of the N entries in the store address queue 143.

The respective match lines 185 for each location in queue 143 are supplied to a match line register 251 shown in FIG. 7 and the respective valid signals fed on lines 186 from the queue 143 are stored in a valid entry register 252. The corresponding outputs of registers 251 and 252 are supplied to respective AND gates 253 so that any matches are checked against corresponding valid entries for those locations in the store address queue 143. The outputs of all the AND gates 253 form inputs to an OR gate 254 which thereby provides an output 255 indicating whether an address match has been found for any valid entry in the store address queue 143. Output 255 forms one input of an OR gate 256 which receives its other input from a hit flag 257 which may be set by execution of an instruction as will be described later. The output of the OR gate 256 forms an input 258 to the control circuitry 160 as signal 258 provides a global hit indicator indicating that somewhere in the store address queue a match has been found.

When signal 258 has been set indicating that a match has been found, the control circuitry 130 will carry out store address actions in preference to load actions and any load address which was input at 140/141 causing the match, will be added to the load address queue 145. The store address queue will be progressively emptied but only up to the point where there are no more store addresses in the queue that match the load address which caused the match and is now located in the queue 145. During this period further store addresses may be accepted by the store address queue but the control circuitry 160 must operate to avoid any store address being sent to the memory before a load address that was previously input through 140/141.

In order to control the extent to which the store address queue 143 is acted upon before the next load address, the circuitry of FIG. 8 is used. The N match lines 185 provide signals which are stored in the match line register 251 and after a global hit signal 258, each bit of the register 251 is cleared independently after a read is made on the corresponding entry.

When a low and store address comparison is effected the hit global signal 258 is initially set to 0. This controls a multiplexer 260 to select the match lines 185 as inputs to the match line register 251. In this way the state of comparing the load address with all store addresses in the queue is saved in the register 251. If any valid entry in the store address queue causes a hit then the global signal 258 will be set to 1 changing the multiplexer 260 to select as its input line 261 forming the output of an AND gate 262. The AND gate receives as inputs the valid entry lines 186 from the store address queue 143 as well as an input 263 from an OR gate 264. The OR gate has one input from the hit flag 257 and a second input 265 which is the recirculated output from the match line register 251. When the global hit signal 258 is set to 1, stores are carried out prior to loads and as each store is removed from the store address queue, its entry in the queue is invalidated thereby changing the signal on line 186 which is supplied to the AND gate 262 in FIG. 8. This will continue to clear the entries in the register 251 until they no longer provide an output in the circuitry shown in FIG. 7 which generates a hit signal set to 1 on line 258. The change in input signal to the control circuitry 160 then indicates that the next load address should be taken from the load address queue 145 in preference to store accesses.

It will be understood that when selector 250 of FIG. 6 detects a new load address from input 140 or 141 for which no hit is detected by the comparators 184, then the control circuitry 160 will carry out the load access before any of the store accesses from queue 143. The selector 250 is responsive to a signal from the load address queue circuitry 145 so that if there is any entry on queue 145 the new load address must be added to the queue. The comparator 250 will then compare the front entry of the load address queue 45 with the store address queue entries when the store address queue has been flushed to deal with the last hit as described above with reference to FIGS. 7 and 8.

In this example it is possible to execute an instruction in one of the execution pipelines to set the hit flag 257 and this will cause a global hit signal on 258 regardless of signals on the match lines 185. This will have the effect of flushing all entries in the store address queue that were there prior to setting of the hit flag 257. All bits of the match line register 251 corresponding to valid entries in the store address queue at the time the flag 257 is set are changed to 1 and then recirculated. Each of those match line entries is then cleared progressively as the store accesses are carried out until all those entries in the match line register 251 have been cleared. In this way it is possible to execute an instruction to prevent further load accesses taking priority until all the store accesses which were in the queue at the time of setting the hit flag have been completed. The control circuitry 160 may be responsive to the Opcode of the instruction received from the address unit and in response to that Opcode set the hit flag 257.

The hit flag 257 and the global signal 258 are common to all bits of the match line register while the match line entries 185 and valid entries 186 are all respective to corresponding locations in the store address queue.

While store address entries are being flushed from the register 143 further store address entries may be added to the store address queue but they will not be acted upon until after the load access operation which caused the hit.

In the above example, each load address queue may consist of a single entry queue. In this case, the selector 250 of FIG. 6 only supplies the new input load address 140/141 to the comparator 184. If there is no match, the load access is effected straight away but if there is a match, the load address is put into 145 which acts as a delay until the conflicting stores are effected. When those stores have been removed from the SAQ, the delayed load access is acted on without further comparison with store addresses in the SAQ.

It will be appreciated that by using a memory system with an M bank and an L bank each having half words located at each word address, and that the provision of byte enable signals for the two bytes of each half word location in the memory banks, the comparator unit 184 can carry out the comparison to check for address conflicts even when the access requires unaligned bytes.

The invention is not limited to the details of the foregoing example.

What is claimed is:

1. A computer system having a memory the memory including two separately accessible memory banks, each bank storing half a word at each word address, a plurality of parallel execution pipelines and a memory access controller, said access controller providing a plurality of queues including store address queues holding addresses for store operations to be effected in the memory, store data queues holding a plurality of data for storing in the memory at locations identified by the store address queues, and load address storage holding addresses for load operations to be effected from the memory, said access controller, including comparator circuitry to compare load addresses received by the controller with addresses in the store address queue and locate any addresses which are the same, each of said addresses including a first set of bits representing a word address together with a second set of byte enable bits that indicate which byte positions at each word address are to be accessed and said comparator having circuitry to compare the byte enable bits of two addresses as well as said first set of bits, the comparator further comprising a plurality of comparator devices, two of which effect comparison of addresses in respective memory banks, each of said two comparator devices having first inputs for comparing the bank word addresses for a pair of load and store addresses and second inputs for comparing respective byte enable bits of a pair of load and store addresses.

2. A computer system according to claim 1 in which control circuitry is provided to select memory access operations from said queues, said control circuitry being responsive to the output of said comparator circuitry to select a load operation before a store address operation if the comparator circuitry does not indicate a store operation at the same address as the load operation.

3. A computer system according to claim 2 in which said control circuitry is operable to select store operations before load operations when said comparator circuitry outputs a hit signal to indicate the same address on a store address queue as a received load address.

4. A computer system according to claim 2 in which said control circuitry includes hit flag circuitry responsive to execution of an instruction to effect all current store operations in the store address queue before executing any further load operations, said hit flag being set in response to execution of said instruction.

5. A computer system according to claim 4 in which said hit flag is operable when set to provide to the control circuitry the same input as said comparator circuitry when the comparator outputs a hit signal to indicate the same address on a store address queue as a received load address.

6. A computer system according to claim 1 in which said plurality of execution pipelines include one or more pipelines in a data unit arranged to execute arithmetic operations and one or more pipelines in an address unit arranged to execute memory addressing operations.

7. A computer system according to claim 6 in which at least two parallel pipelines are provided in the data unit and at least two parallel pipelines are provided in the address unit.

8. A computer system according to claim 1 in which said memory includes two or more memory regions having different mapping within the addressable memory space of the computer system, said comparator circuitry including comparator means to compare the mapping of load addresses with each entry in the store address queues as well as comparing the word address and the byte enable bits.

9. A method of operating a computer system having a memory, a plurality of parallel execution pipelines and a memory access controller, said method comprising forming a plurality of queues including store address queues holding addresses for store operations to be effected in the memory, store data queues holding a plurality of data for storing in the memory at locations identified by the store address queue and load address storage holding addresses for load operations to be effected from the memory wherein the data is stored in said memory in two separately addressable memory banks sharing common addresses, each bank storing half a word at each word address, said method further comprising comparing received load addresses with addresses in a store address queue to locate addresses which are the same, each of said addresses including a first set of bits representing a word address together with a second set of byte enable bits, the comparison including comparing the byte enable bits of the two addresses as well as comparing said first set of bits, said comparison being effected by comparing bank word addresses in two comparison devices each for a respective bank and each for saving the same bank word address, and comparing in a further comparison device byte enable signals which represent respectively byte enable bits for the two different banks.

10. A method of operating a computer system according to claim 9 in which store addresses are removed from the store address queue in accordance with the order of entries in the queue and said comparison of addresses compares the next load address with all entries in the store address queue.

11. A method according to claim 9 including executing an instruction to set a hit flag indicating that all current store addresses in the store address queue should be accessed for a store operation before executing any further load operation.

12. A computer system having a memory, a plurality of parallel execution pipelines and a memory access controller, said access controller providing a plurality of queues including store address queues holding addresses for store operations to be effected in the memory, store data queues holding a plurality of data for storing in the memory at locations identified by the store address queues, and load address storage holding addresses for load operations to be effected from the memory, said access controller including comparator circuitry to compare load addresses received by the controller with addresses in the store address queue and locate any addresses which are the same, each of said addresses including a first set of bits representing a word address together with a second set of byte enable bits, the byte enable bits indicating which byte positions at each word address are to be accessed, and said comparator having circuitry to compare the byte enable bits of the two addresses as well as said first set of bits.

13. A method of operating a computer system having a memory, a plurality of parallel execution pipelines and a memory access controller, said method comprising forming a plurality of queues including store address queues holding addresses for store operations to be effected in the memory, store data queues holding a plurality of data for storing in the memory at locations identified by the store address queue and load address storage holding addresses for load operations to be effected from the memory, said method further comprising comparing received load addresses with addresses in a store address queue to locate addresses which are the same, each of said addresses including a first set of bits representing a word address together with a second set of byte enable bits, the byte enable bits indicating which byte positions at each word address are to be accessed, the comparison including comparing the byte enable bits of the two addresses as well as comparing said first set of bits.

14. A computer system having a memory, a plurality of parallel execution pipelines, the plurality of parallel execution pipelines including one or more pipelines in a data unit arranged to execute arithmetic operations and one or more pipelines in an address unit arranged to execute memory addressing operations, and a memory access controller, said access controller providing a plurality of queues including store address queues holding addresses for store operations to be effected in the memory, store data queues holding a plurality of data for storing in the memory at locations identified by the store address queues, and load address storage holding addresses for load operations to be effected from the memory, said access controller, including comparator circuitry to compare load addresses received by the controller with addresses in the store address queue and locate any addresses which are the same, each of said addresses including a first set of bits representing a word address together with a second set of byte enable bits, the byte enable bits indicating which byte positions at each word address are to be accessed, and said comparator having circuitry to compare the byte enable bits of the two addresses as well as said first set of bits.

15. A method of operating a computer system having a memory, a plurality of parallel execution pipelines, the plurality of parallel execution pipelines including one or more pipelines in a data unit arranged to execute arithmetic operations and one or more pipelines in an address unit arranged to execute memory addressing operations and a memory access controller, said method comprising forming a plurality of queues including store address queues holding addresses for store operations to be effected in the memory, store data queues holding a plurality of data for storing in the memory at locations identified by the store address queue and load address storage holding addresses for load operations to be effected from the memory, said method further comprising comparing received load addresses with addresses in a store address queue to locate addresses which are the same, each of said addresses including a first set of bits representing a word address together with a second set of byte enable bits, the byte enable bits indicating which byte positions at each word address are to be accessed, the comparison including comparing the byte enable bits of the two addresses as well as comparing said first set of bits.

\* \* \* \* \*